July 28, 1959 — W. E. REED ET AL — 2,896,354
SPORTING TACKLE
Filed May 19, 1955
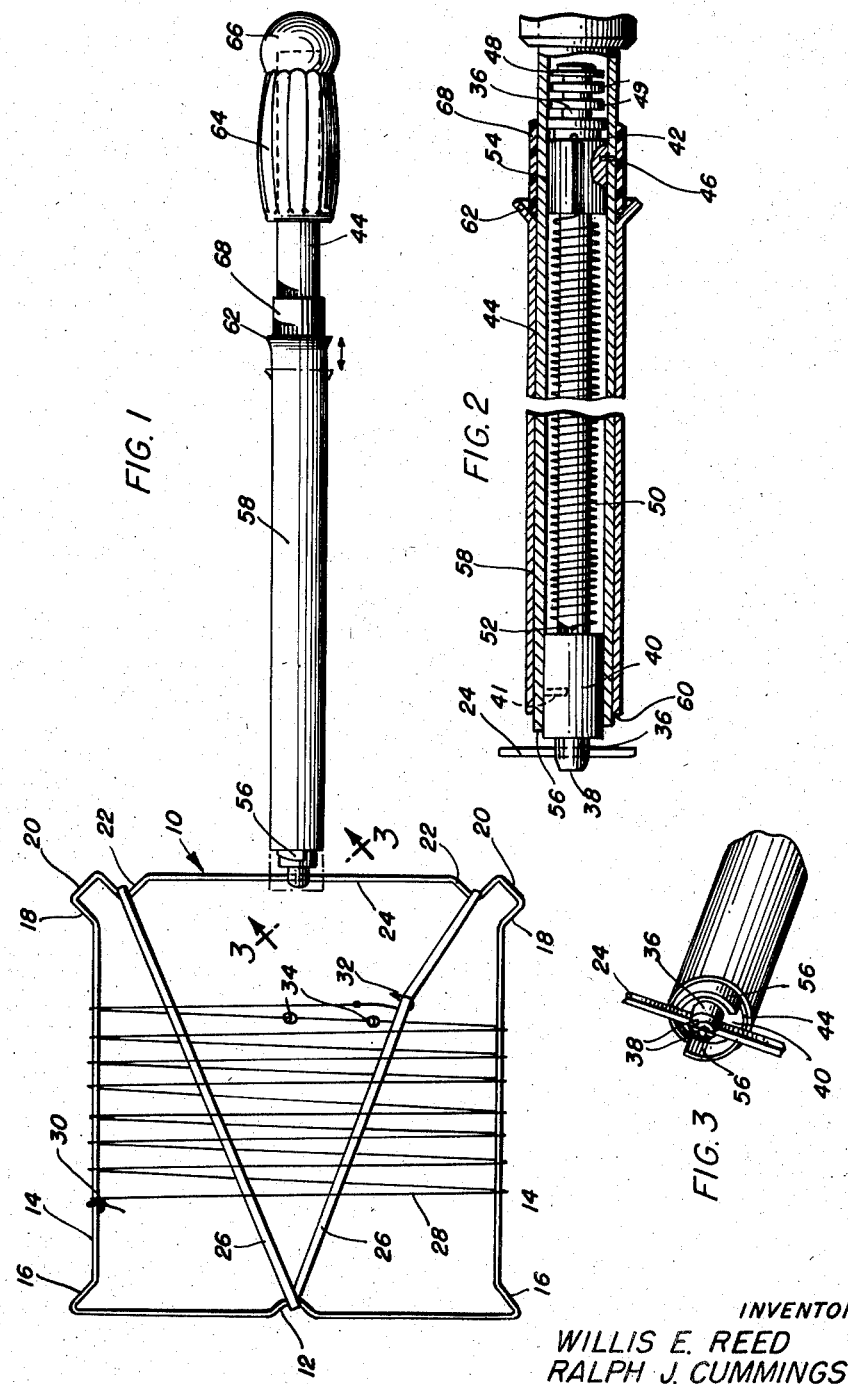
INVENTORS:
WILLIS E. REED
RALPH J. CUMMINGS
BY
Kent W. Wonnell
ATT'Y

United States Patent Office 2,896,354
Patented July 28, 1959

2,896,354

SPORTING TACKLE

Willis E. Reed, Cicero, and Ralph J. Cummings, Berwyn, Ill.

Application May 19, 1955, Serial No. 509,542

4 Claims. (Cl. 43—21)

This invention relates to a winding reel for fishing lines and the like, and is more particularly described as an ice fishing tackle although it may have a more general use wherever applicable.

In fishing through the ice which is usually done through a hole in the ice and frequently in a small protecting shanty where there is not sufficient space to move a pole, one of the great difficulties is to eliminate tangling of the line in drawing it out of the water and in preventing the line from falling on the ice and freezing during the withdrawing and other operations.

The present invention provides a reel upon which a fishing line may be spring-wound, thereby taking up the slack and preventing any slack portion of the line from falling or resting upon the ice.

An important object of the invention is to provide a flat compact reel upon which a line may be wound.

A further object of the invention is to provide a fishing tackle having a handle for supporting it, a rotatable flat reel and a spring connection within the handle for supporting the reel and rotating it.

A further object of the invention is to provide means for automatically winding a line upon a flat reel by means of a releasable spring.

A still further object of the invention is to provide a supporting handle for a rotatable reel mounted in the handle for a limited longitudinal releasing movement, and in providing a spring in the handle which rotates the reel without manually engaging the reel.

Still a further object of the invention is to provide a reel of the flat type having resilient members by which a fishhook may be engaged and terminating in any portion of the frame.

Other objects of the invention will appear in the specification and will be apparent from the accompanying drawings in which, Fig. 1 is an elevational view of a sporting tackle in accordance with this invention.

Fig. 2 is a longitudinal sectional view through the supporting handle; and

Fig. 3 is a perspective view of the end connection of the handle with the reel as taken on the line 3—3 of Fig. 1.

This tackle may be used generally for fishing and is convenient for use in place of ordinary fishpoles in many circumstances. It is particularly useful for fishing through a hole in the ice and from the interior of a small fishing shanty which is located over the hole in the ice, and it may also be used generally in fishing from a wharf, a bridge, or wherever casting is impractical.

One advantage of the use of the present tackle is that the line may be unwound manually from the reel to a desired length which will set up a spring in the handle for operation so that if it is desired a fish may be reeled in by means of the spring or if the fish is too heavy, the line may be lifted with one hand, and the slack portion of the line may then be taken up by the spring rotation of the reel which is carried by the other hand.

Referring now more particularly to the drawings, a flat reel 10 is suitably made in substantially rectangular form of a suitable length of wire either flat or round and arranged in a common plane. At the outer end of the frame substantially at the center is an inward bend 12, and the opposite sides 14 are offset inwardly from the corners by angular bends 16 at the outer end and 18 at the inner end. Each inner corner 20 may be an outward angular projection with an inner bend 22 which extends outwardly to an inner crosspiece 24 upon which the reel is mounted.

The inward bend 12 in the outer side of the frame and the inner bends 22 at the ends of the crosspiece 24 provide means for seating a flexible band 26 (or bands) which also extend flatly in the plane of the frame. Upon this frame may be wound a continuous line 28 in the form of a fishline, or any other line or material which is to be carried by the frame. A fishline may be connected by a knot 30 at one end of the line to one side of the frame and wound completely upon the frame up to the other end which may have a hook 32 fastened thereto and possibly a sinker or sinkers 34.

In winding the line upon the reel, the hook will not always be in a position to engage a fixed portion of the reel so that the flexible bands 26 are provided for the engagement of the hook and will be deflected to any desired extent so that the hook and line will be stretched, untangled and yieldingly taut within the frame. To disengage the hook, the flexible band to which it is attached is simply sprung out of engagement therewith. The crosspiece 24 of the reel is attached to a rod 36 which may have bifurcated ends for tightly attaching and clamping the crosspiece therebetween. Secured to the rod at the outer end is a bearing bushing 40 as by means of a pin 41 extending through the bushing into the rod, and at the other end of the rod is a rear bushing 42 through which the rod is freely rotatable.

Surrounding the rod is a handle sleeve 44 which fits rotatably upon the front and rear bushings 40 and 42, and the latter is attached to the sleeve in any suitable manner as by a pin 46 extending through the sleeve into the bushing near the outer end of the handle sleeve. The handle rod 36 extends through and beyond the rear bushing 42 and is fitted with a washer or a stop nut 48 which limits the movement of the rod by engaging the bearing in one direction of movement, through friction clutch rings 49, if desired.

Surrounding the rod 36 is a coil spring 50 having many closely spaced turns. One end of this spring is secured to the rod as by inserting the end through a hole 52 near the front washer 40 and the other end of the spring is attached to the rear bushing 42 as by inserting it through a longitudinal slot 54 in the periphery of the rear bushing 42 which is affixed to the handle sleeve 44.

With this construction, the reel which is attached to the rod 36 may be rotated to wind the spring 50 relative to the handle sleeve 44 and the sleeve and the rod can be moved relatively to each other to a limit extending in a longitudinal direction.

At the outer end of the sleeve 44 are ratchet teeth 56 which may project beyond the end of the front bushing 40 and into the path of the crosspiece 24 of the reel frame. By rotating the reel frame in one direction with respect to the handle sleeve 44, the spring 50 may therefore be wound and placed under considerable tension like a curtain rod.

In the fishing operation, the unwinding of a fishing line from the reel is in a direction to place the spring 50 under tension and as the line is unwound, the crosspiece 24 is engaged by the ratchet teeth 56 holding the line in its extended position.

In order to release the spring 50 and thereby to wind up the reel with the line on it, an outer release sleeve 58 is rotatably and slidably mounted upon the handle sleeve 44 and preferably has a flush and straight outer end 60 and a flaring inner end 62 for thumb engagement and operation.

At the extreme handle sleeve 44 is a handle grip 64 usually made of rubber or similar flexible composition tightly secured to the sleeve and having an end bulb 66 which closes the end of the sleeve. The inner end of the grip is located at a distance from the flaring inner end 62 of the release sleeve 58 and the movement of the sleeve toward the handle is limited by a collar 68 which is firmly attached to the outside of the handle sleeve 44 and is adapted to engage the flaring end of the release sleeve 58 in such a position that the outer end 60 does not cover the ratchet teeth 56 of the handle sleeve. This collar may be made of fiber, rubber or any other suitable material and it provides a contact piece for the thumb of an operator while the remainder of the same hand is in engagement with the grip 64 so that the thumb may be pressed against the flaring end 62 of the release sleeve to move the opposite end 60 beyond ratchet teeth 56 and by engaging the crosspiece 24 of the reel frame to free the reel from engagement with the ratchet teeth and to bring the winding spring 50 into operation.

This tackle is useful for ice fishing, boat fishing and other types of fishing where long casting is not required. It has the advantage that the entire fishing line, the bobber and hook may be wound upon the reel, thus preventing the line from contacting and freezing upon the ice and thereby losing the line. Furthermore, the tension of the automatic reel may be set for any practical depth of fishing by counting the clicks or turns of the reel with respect to the handle as the torsion spring is wound. This tackle also eliminates tangling of the line so common to other fishing tackle and is convenient for carrying because of its compactness and also in providing a ready lodging place for the hook by engagement with one of the flexible bands to hold it in place.

While a preferred construction has been described in some detail, it should be regarded by way of illustration and example rather than a restriction or limitation of the invention as various changes may be made in the construction, combination and arrangement of the parts without departing from the spirit and scope of the invention.

We claim:

1. In a fishing tackle, an exposed flat reel, a fishing line wound on the reel, a rod engaged on end of the reel, a handle surrounding the rod, a spring to rewind the line on the reel as unwound therefrom and also surrounding the rod and attached at opposite ends to the rod and to the handle for rotating the reel relative to the handle and automatically rewinding the line on the reel as much as unwound therefrom, a release sleeve mounted on the outside of the handle and movable longitudinally thereof, ratchet teeth at the end of the handle to engage the reel, the release sleeve being manually movable longitudinally with respect to the handle by contacting the sleeve at the end opposite the ratchet for disengaging the reel from the ratchet teeth.

2. A fishing tackle comprising a flat frame, flexible means mounted on the frame for engaging the hook end of a fishing line wound thereon, a rod secured to one side of the frame forming the axis of rotation thereof, a handle sleeve mounted on the rod rotatably and longitudinally movable with respect thereto, the end of the handle sleeve having ratchet teeth thereon adapted to engage the frame adjacent its connection with the rod, a coil spring wound about the rod connected at one end to the rod and at the other end of the sleeve tending to rotate the frame in a direction against the ratchet teeth, a release sleeve surrounding the handle sleeve and movable thereon, the release sleeve having a flaring end for thumb engagement and the other end located adjacent to the ratchet teeth and movable lengthwise by such thumb engagement to disengage the reel from the ratchet teeth and thereby freeing the reel for rotation by said spring.

3. In a fishing tackle in accordance with claim 2, the rod having stop means at the outer end of the handle to engage the bearing which is secured to the handle to limit the movement of the rod in that direction.

4. In a fishing tackle in accordance with claim 2, a handle grip at the end of the handle shaft and a collar between the grip and the flaring end of the release sleeve to limit the movement of the release sleeve in the direction of the handle grip, and to provide a contact piece for the thumb of an operator resting thereon.

References Cited in the file of this patent

UNITED STATES PATENTS

| | | |
|---|---|---|
| 566,595 | Maguson | Aug. 25, 1896 |
| 1,823,165 | Proctor | Sept. 15, 1931 |
| 2,366,755 | Rogne | Jan. 9, 1945 |
| 2,576,587 | Furbush | Nov. 27, 1951 |
| 2,615,648 | Carlson | Oct. 28, 1952 |
| 2,647,341 | Donnell | Aug. 4, 1953 |